(12) United States Patent
Ching-shun et al.

(10) Patent No.: US 7,181,984 B2
(45) Date of Patent: Feb. 27, 2007

(54) MAGNETIC SENSOR

(75) Inventors: Ko Ching-shun, Yungho (TW); Yang Yao-song, Toufen Township, Miaoli County (TW)

(73) Assignee: Taigene Metal Industry Co., Ltd., Taipei (TW)

( * ) Notice: Subject to any disclaimer, the term of this patent is extended or adjusted under 35 U.S.C. 154(b) by 0 days.

(21) Appl. No.: 11/016,616

(22) Filed: Dec. 17, 2004

(65) Prior Publication Data
US 2005/0145042 A1 Jul. 7, 2005

(30) Foreign Application Priority Data
Dec. 31, 2003 (TW) .............. 92223047 U

(51) Int. Cl.
G01L 3/02 (2006.01)
(52) U.S. Cl. ................................ 73/862.331
(58) Field of Classification Search ..................
73/862.331–862.333, 779
See application file for complete search history.

(56) References Cited

U.S. PATENT DOCUMENTS

| | | | |
|---|---|---|---|
| 2,653,520 A * | 9/1953 | Studders ................ 428/548 |
| 4,803,629 A | 2/1989 | Noto et al. |
| 4,896,544 A | 1/1990 | Garshelis |
| 5,117,183 A | 5/1992 | Santos |
| 5,123,279 A | 6/1992 | Henein et al. |
| 5,261,637 A | 11/1993 | Curnow |
| 5,351,555 A | 10/1994 | Garshelis |
| 5,725,023 A | 3/1998 | Padula |
| 5,821,710 A * | 10/1998 | Masuzawa et al. ........ 318/254 |
| 6,329,782 B1 | 12/2001 | Chen et al. |
| 6,373,211 B1 | 4/2002 | Henry et al. |
| 6,392,418 B1 | 5/2002 | Mir et al. |
| 6,400,142 B1 | 6/2002 | Schroeder |
| 6,429,647 B1 | 8/2002 | Nicholson |
| 6,437,526 B1 | 8/2002 | Derouane et al. |
| 6,443,020 B1 | 9/2002 | Lin et al. |
| 6,448,724 B1 | 9/2002 | Kleinau et al. |
| 6,460,649 B2 | 10/2002 | Chen et al. |
| 6,465,039 B1 | 10/2002 | Pinkerton et al. |
| 6,465,975 B1 | 10/2002 | Naidu |
| 6,469,499 B2 | 10/2002 | Delaporte |
| 6,486,658 B2 | 11/2002 | Naidu |
| 6,487,501 B1 | 11/2002 | Jeon |
| 6,489,761 B1 | 12/2002 | Schroedet et al. |
| 6,498,409 B1 | 12/2002 | Collier-Hallman et al. |
| 6,498,449 B1 | 12/2002 | Chen et al. |
| 6,498,451 B1 | 12/2002 | Boules et al. |
| 6,499,559 B2 | 12/2002 | Mc Cann et al. |
| 6,512,369 B2 | 1/2003 | Heremans et al. |
| 6,547,043 B2 | 4/2003 | Card |
| 6,549,871 B1 | 4/2003 | Mir et al. |

(Continued)

Primary Examiner—Max Noori
(74) Attorney, Agent, or Firm—Harness, Dickey & Pierce, P.L.C.

(57) ABSTRACT

The present invention discloses a magnetic sensor, comprising a circular base, the center of said base having a circular hole, the lower surface of said circular base being provided with a flange; and a plurality of ring-shaped permanent magnets of varying sizes, said ring-shaped permanent magnets having a plurality of magnetic poles, and said plurality of ring-shaped permanent magnets adhering individually to said circular base and having the center of said circular base as their center, with sensing action being achieved through use of the plurality of magnetic poles of said plurality of ring-shaped permanent magnets.

36 Claims, 1 Drawing Sheet

U.S. PATENT DOCUMENTS

| | | |
|---|---|---|
| 6,566,829 B1 | 5/2003 | Naidu et al. |
| 6,566,860 B1 | 5/2003 | Lin et al. |
| 6,577,086 B2 | 6/2003 | Sebastian |
| 6,591,179 B1 | 7/2003 | Check et al. |
| 6,614,223 B2 | 9/2003 | Schroeder et al. |
| 6,637,558 B2 | 10/2003 | Oliver et al. |
| 6,653,829 B1 | 11/2003 | Henry et al. |
| 6,659,218 B2 | 12/2003 | Thomas et al. |
| 6,674,279 B2 | 1/2004 | Manlove et al. |
| 6,690,135 B2 | 2/2004 | Mir et al. |
| 6,694,287 B2 | 2/2004 | Mir et al. |
| 6,713,921 B2 | 3/2004 | Sebastian et al. |
| 6,720,763 B1 | 4/2004 | Nehl et al. |
| 6,759,780 B2 | 7/2004 | Liu et al. |
| 6,776,058 B1 | 8/2004 | Schroeder |
| 6,777,928 B2 | 8/2004 | Ramirez |
| 6,788,013 B2 | 9/2004 | Islam et al. |
| 6,791,217 B2 | 9/2004 | Collier-Hallman et al. |
| 2002/0093332 A1 | 7/2002 | Schroeder et al. |
| 2003/0034772 A1 | 2/2003 | Galvan et al. |
| 2004/0027846 A1 | 2/2004 | Schroeder et al. |
| 2004/0042845 A1 | 3/2004 | Shost et al. |
| 2004/0150393 A1 | 8/2004 | Lequesne et al. |
| 2004/0164727 A1 | 8/2004 | Lin |
| 2004/0164730 A1 | 8/2004 | Schroeder et al. |
| 2004/0196028 A1 | 10/2004 | Schroeder et al. |
| 2004/0257070 A1 | 12/2004 | Takuma |
| 2004/0257076 A1 | 12/2004 | Mattson et al. |

* cited by examiner

MAGNETIC SENSOR

CROSS REFERENCE TO RELATED APPLICATIONS

This application claims priority to Taiwanese Application No. 092223047, filed Dec. 31, 2003, which is incorporated by reference herein.

BACKGROUND OF THE INVENTION

The present invention pertains to a magnetic sensor. In particular, it concerns a magnetic sensor to be used in electronic power steering (EPS) systems in automobiles.

With the rapid development of science and technology, many sensors, such as image sensors, temperature sensors, and magnetic sensors, have been widely applied in a variety of fields such as telecommunications and the automobile industry. In many applications, images captured by an image sensor are not simply output for observation. On the contrary, image sensor information can be used for other purposes, such as for detecting the motion of an optical mouse or detecting the motion of an object. For example, the image sensors in the visual unit of a toy or machine generally are used to detect motion. In the imaging field, image sensors are also often used to distinguish shapes or objects.

In addition, there have been major developments in the materials used to form the aforesaid magnetic sensors. Some of these magnetic sensors can be used in automobiles having electronic power steering (EPS) systems. In other words, magnetic sensors can be used to control the direction and speed of an automobile's power steering wheel.

Conventional magnetic sensors are made directly of magnets and are then embedded in the motor axle. They are relatively dependent on environmental and climatic factors. Therefore, in view of the above drawbacks, the present invention presents a method for solving the above problems.

SUMMARY OF THE INVENTION

Therefore, the present invention is created in view of the aforementioned problems, and the object of the present invention is to provide a magnetic sensor that can equip an automobile having an electronic power steering (EPS) system. For example, it could be applied to an electronic power steering wheel or a brushless DC motor.

The object of the present invention is to disclose a magnetic sensor, comprising a base and a plurality of permanent magnets of varying sizes. Each of said permanent magnets has a plurality of magnetic poles, and said plurality of permanent magnets individually adhere to the aforesaid base. Sensing action is achieved through use of the plurality of magnetic poles of said plurality of ring-shaped permanent magnets.

The present invention discloses a magnetic sensor, comprising a circular base, the center of said base having a circular hole, the lower surface of said circular base being provided with a flange; and a plurality of ring-shaped permanent magnets of varying sizes, said ring-shaped permanent magnets having a plurality of magnetic poles, and said plurality of ring-shaped permanent magnets adhering individually to said circular base and having the center of said circular base as their center, with sensing action being achieved through use of the plurality of magnetic poles of said plurality of ring-shaped permanent magnets.

BRIEF DESCRIPTION OF DRAWINGS

In the descriptions below, preferred embodiments of the present invention will be explained in greater detail in light of the following drawings.

DETAILED DESCRIPTION

The present invention is described as a magnetic sensor. This magnetic sensor comprises a circular base and a plurality of ring-shaped permanent magnets of varying sizes, wherein said circular base is a wheel that functions as a support and that is connected to the motor axle. Said ring-shaped permanent magnets are the main part of said magnetic sensor. Its function is, of course, by means of the number of magnetic poles of the permanent magnets, to achieve sensing action with Hall components. In the following description, a specific, detailed explanation is provided so that this embodiment might be fully understood. Nevertheless, one skilled in the art could execute the present invention without one or more specific, detailed explanations by perhaps employing different methods or different embodiment features.

Figure 1:
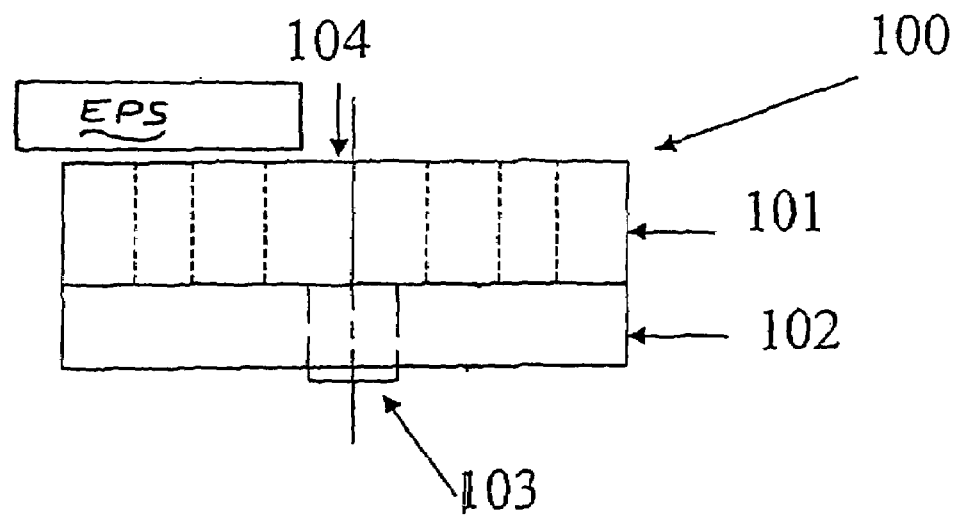
FIG. 1 shows a lateral view of a magnetic sensor of the present invention.

Reference is made to FIG. 1, which provides a lateral view of a magnetic sensor 100 of the present invention. Said magnetic sensor 100 comprises a circular base 102 and a plurality of ring-shaped permanent magnets 101 of varying sizes. There is a circular hole 104 at the center of said circular base 102, and the lower surface of the circular base 102 is provided with a flange 103. Each of the plurality of ring-shaped permanent magnets 101 of various sizes has a plurality of magnetic poles, such as 6 or 72 magnetic poles. In addition, said plurality of ring-shaped permanent magnets 101 adhere individually to said circular base 102 and have as their center the center of said circular base 102. Sensing action is achieved through use of the plurality of magnetic poles of said plurality of ring-shaped permanent magnets 101.

The circular base 102 in the present invention can be formed from a metal, plastic, or ceramic material. Metal that is of magnetically permeable material is especially preferred. In other words, the material for the circular base 102 of the present invention can be selected as is necessary.

In addition, the plurality of ring-shaped permanent magnets 101 in accordance with the present invention can be formed from materials listed in the following: aluminum nickel cobalt (AlNiCo), samarium cobalt (SmCo), neodymium iron boron (NdFeB), hard ferrite, Magnequench® (MQ) magnetic powder, samarium iron, nitrogen (SmFeN), or manganese aluminum carbon (MnAlC). Therefore, in one embodiment, permanent magnets could be selected that are made from any of the above materials to serve as the ring-shaped permanent magnets 101 of the present invention. Said ring-shaped permanent magnets 101 can be made by employing the methods of sintering, casting, or bonding.

Furthermore, in the above-described method of adhesion, said plurality of ring-shaped permanent magnets 101 can be adhered to said circular base 101 using a glue. In embodiment 1, said glue is an epoxy resin.

Figure 2:
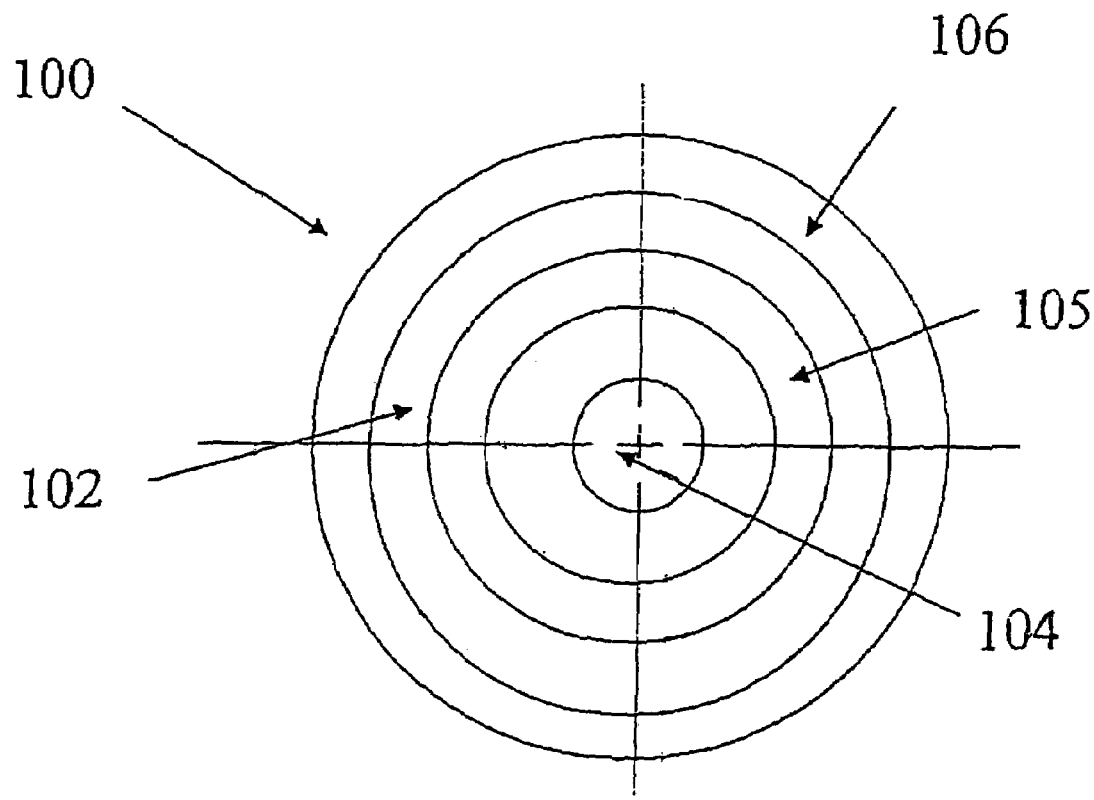
FIG. 2 shows a top view of a magnetic sensor of the present invention.

Reference is made to FIG. 2, which is a drawing of a magnetic sensor 100 of the present invention. Said magnet sensor 100 comprises a circular base 102 and two ring-shaped permanent magnets 105 and 106 of different sizes.

There is a circular hole 104 at the center of said circular base 102, and the lower surface of the circular base 102 is provided with a flange 103 (as shown in FIG. 1). Said ring-shaped permanent magnets 105 and 106 have a plurality of magnetic poles, e.g. 6 or 72 magnetic poles. In addition, said ring-shaped permanent magnets 105 and 106 separately adhere to said circular base 102 and have the center of said circular base 102 as their center. Sensing action is achieved by using the plurality of magnetic poles of said ring-shaped permanent magnets 105 and 106.

Furthermore, in the above-described method of adhesion, said plurality of ring-shaped permanent magnets 105 and 106 can be adhered to said circular base 101 using a glue. In embodiment 1, said glue is an epoxy resin.

The magnetic sensor of the present invention can be used in automobiles that have an electronic power steering (EPS) system. For example, it can be used on a power steering wheel and a brushless DC motor. In other words, a magnetic sensor of the present invention can be used to control the speed of an automobile or the direction of a steering wheel. Since the aforementioned materials are widely used in manufacturing magnetic sensors, they are easily available for manufacturing magnetic sensors.

Advantages of the present invention are: 1. The circular base can undergo precision-machining. If the circular base materials are ferrous magnetic materials, they can boost magnetic permeability effects. 2. The form of adhesion can, on the one hand, reduce consumption of magnet material, while on the other hand, achieving greater dependability, especially with respect to environmental and climatic factors.

Though a preferred embodiment is used to explain the present invention to one familiar with the art, the intent is not to impose limits on the present invention. Modified and similar arrangements that remain within the spirit and scope of the present invention should be included under the claims as described below. Such a scope should be consistent with the broadest interpretation covering all modified and similar structures. Therefore, the explanation of the above preferred embodiment of the present invention can be used to distinguish various modifications made within the spirit and scope of the present invention.

The invention claimed is:

1. An automotive vehicle system comprising:
    an electronic power steering system;
    a base having a circular periphery with a circular, central hole and a flange; and
    multiple ring-shaped permanent magnets of varying diameter sizes concentrically aligned with each other through adhesive bonding, and each of the magnets having a first surface adhered to the base and an opposite second surface, the second surfaces being substantially co-planar with each other;
    the permanent magnets operably sensing the position of the power steering system through a plurality of magnetic poles of the permanent magnets.

2. The automotive vehicle system of claim 1 further comprising a non-conductive base attached to the permanent magnets.

3. The automotive vehicle system of claim 1, wherein the material of the base is a metal.

4. The automotive vehicle system of claim 1 wherein the material of the base is a plastic.

5. The automotive vehicle system of claim 1 wherein the material of the base is a ceramic.

6. The automotive vehicle system of claim 1 wherein the permanent magnets have at least six magnetic poles.

7. The automotive vehicle system of claim 1, wherein at least a majority of the material of the permanent magnets is aluminum nickel cobalt (AlNiCo).

8. The automotive vehicle system of claim 1, wherein at least a majority of the material of the permanent magnet is samarium cobalt (SmCo).

9. The automotive vehicle system of claim 1, wherein at least a majority of the material of the permanent magnets is neodymium iron boron (NdFeB).

10. The automotive vehicle system of claim 1, wherein at least a majority of the material of the permanent magnets is hard ferrite.

11. The automotive vehicle system of claim 2 further comprising an epoxy resin attaching the permanent magnets directly to the base, the base being one of: plastic and ceramic.

12. The automotive vehicle system of claim 1 wherein the flange projects from a surface of the base opposite from the permanent magnets.

13. A method of manufacturing a magnetic sensor including a base and permanent magnets, the method comprising:
    (a) creating the permanent magnets by one of: (i) sintering, (ii) casting and (iii) bonding;
    (b) creating the permanent magnets of different annular diameters in ring-like shades with substantially flat and co-planar surfaces opposite the base;
    (c) machining the base with a substantially circular periphery and a central hole; and
    (d) adhesively attaching the permanent magnets to the base with apertures of the magnets being concentrically aligned about a rotational axis of the base.

14. The method of claim 13, further comprising creating a plurality of the permanent magnets as a plurality of ring-shaped permanent magnets of varying sizes.

15. The method of claim 13, further comprising creating the permanent magnets at least in part by sintering.

16. The method of claim 13, further comprising creating the permanent magnets at least in part by casting.

17. The method of claim 13, further comprising creating the permanent magnets at least in part by bonding.

18. The method of claim 13, wherein at least a majority of the material of the permanent magnets is magnetic powder.

19. The method of claim 13, wherein at least a majority of the material of the permanent magnets is samarium iron nitrogen (SmFeN).

20. The method of claim 13, further comprising adhesively attaching the magnets with an epoxy resin.

21. A magnetic sensor, comprising:
    a circular base, the center of the circular base having a circular hole, and the bottom surface of the circular base having a flange; and
    a plurality of ring-shaped permanent magnets of varying sizes, each of the ring-shaped permanent magnets having a plurality of magnetic poles, the plurality of ring-shaped permanent magnets individually adhering to the circular base and having as their center the center of the circular base.

22. The magnetic sensor of claim 21, wherein the material of the circular base is metal.

23. The magnetic sensor of claim 21, wherein the material of the circular base is plastic.

24. The magnetic sensor of claim 21, wherein the material of the circular base is ceramic.

25. The magnetic sensor of claim 21, wherein the ring-shaped permanent magnets are sintered.

26. The magnetic sensor of claim 21, wherein the ring-shaped permanent magnets are cast.

27. The magnetic sensor of claim 21, further comprising an adhesive located on the ring-shaped permanent magnets.

28. The magnetic sensor of claim 21, wherein at least a majority of the material of the ring-shaped permanent magnets is aluminum nickel cobalt (AlNiCo).

29. The magnetic sensor of claim 21, wherein at least a majority of the material of the ring-shaped permanent magnets is samarium cobalt (SmCo).

30. The magnetic sensor of claim 21, wherein at least a majority of the material of the ring-shaped permanent magnets is neodymium iron boron (NdFeB).

31. The magnetic sensor of claim 21, wherein at least a majority of the material of the ring-shaped permanent magnets is hard ferrite.

32. The magnetic sensor of claim 21, wherein at least a majority of the material of the ring-shaped permanent magnets is magnetic powder.

33. The magnetic sensor of claim 21, wherein at least a majority of the material of the ring-shaped permanent magnets is samarium iron nitrogen (SmFeN).

34. The magnetic sensor of claim 21, wherein at least a majority of the material of the ring-shaped permanent magnets is manganese aluminum cobalt (MnAlC).

35. The magnetic sensor of claim 21, wherein glue bonds the permanent magnets to the circular base.

36. The magnetic sensor of claim 21, wherein the base is substantially nonconductive.

* * * * *

UNITED STATES PATENT AND TRADEMARK OFFICE
CERTIFICATE OF CORRECTION

PATENT NO. : 7,181,984 B2
APPLICATION NO. : 11/016616
DATED : February 27, 2007
INVENTOR(S) : Ko Ching-shun and Yan Yao-song It is certified that error appears in the above-identified patent and that said Letters Patent is hereby corrected as shown below:

ON TITLE PAGE, Item -56-, U.S. Patent Documents, Reference No. 1, "2,653,520" should be --2,652,520--.

ON TITLE PAGE, Item -56-, U.S. Patent Documents, page 2, last reference "2004/0257076" should be --2004/0257067--.

Column 4, line 25, Claim 13, "shades" should be --shapes--.

Signed and Sealed this

Tenth Day of July, 2007

JON W. DUDAS
*Director of the United States Patent and Trademark Office*